United States Patent [19]

Piechnick

[11] Patent Number: 4,996,637
[45] Date of Patent: Feb. 26, 1991

[54] ELECTRICAL CONVERTER UTILIZING SWITCHED UNI-DIRECTIONAL AND BI-DIRECTIONAL ENERGY SOURCES

[75] Inventor: John J. Piechnick, Hazelwood Park, Australia

[73] Assignee: Power Reflex Pty. Ltd., The Levels, Australia

[21] Appl. No.: 453,510

[22] Filed: Dec. 20, 1989

[51] Int. Cl.⁵ ............................................. H02M 3/335
[52] U.S. Cl. ....................................... 363/16; 363/43; 363/46; 363/98; 363/132; 363/136; 307/43; 307/72
[58] Field of Search ........................ 363/16, 17, 43, 85, 363/88, 96, 98, 127, 128, 129, 132, 135, 136; 307/4, 43, 72, 75, 80, 81

[56] References Cited

U.S. PATENT DOCUMENTS

| | | | |
|---|---|---|---|
| 3,859,584 | 1/1975 | Corry | 363/43 |
| 4,203,151 | 5/1980 | Baker | 363/43 |
| 4,238,820 | 12/1980 | Naaijer | 363/136 |
| 4,292,544 | 9/1981 | Ishii et al. | 363/16 |
| 4,413,220 | 11/1983 | Waineo | 307/43 |
| 4,733,342 | 3/1988 | Mueller et al. | 363/132 |
| 4,805,082 | 2/1989 | Heinrich et al. | 363/129 |

FOREIGN PATENT DOCUMENTS

| | | |
|---|---|---|
| 5567480 | 4/1980 | Australia . |
| 7775087 | 2/1987 | Australia . |
| 60-44071 | 1/1985 | Japan . |
| 523480 | 1/1976 | U.S.S.R. . |
| 542293 | 5/1977 | U.S.S.R. . |

Primary Examiner—Peter S. Wong
Attorney, Agent, or Firm—Edward W. Callan

[57] ABSTRACT

The invention relates to a converter which can operate as a rectifier to rectify alternating current into direct current running in one direction (for example to charge batteries) or a converter where DC (from the batteries) can be converted to AC and supplement AC power, for example to supplement an alternator output in peak load conditions. The converter comprises a uni-directional electrical energy source (battery) and a bi-directional energy source (small battery bank connected for reverse direction current flow, capacitor or fuel cell) which is capable of initiating an alternating current when controlled by thyristors fired in sequence and with such periods that a sine wave can be simulated. The switches are controlled by a thyristor trigger logic current control unit which may for example be a micro processor.

18 Claims, 16 Drawing Sheets

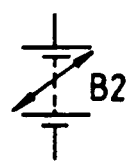
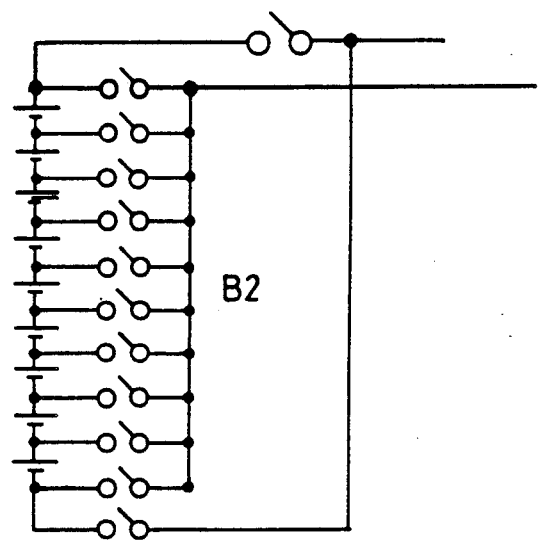
FIG 1A　　　　　FIG 1B
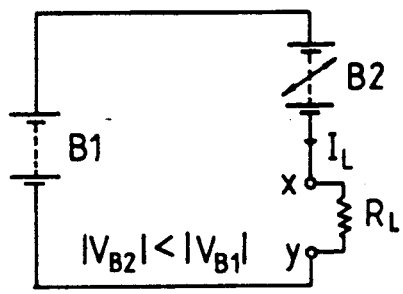
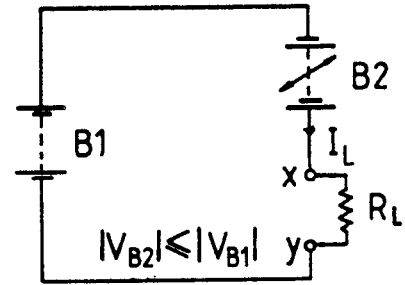
FIG 2A　　　　　FIG 2B
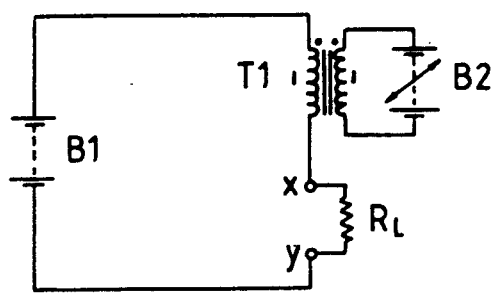
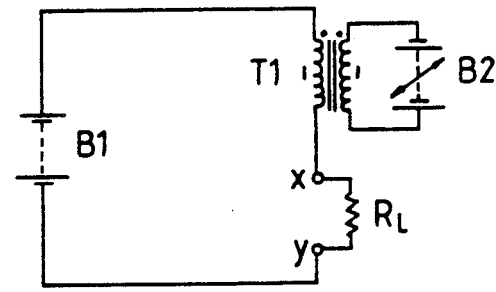
FIG 3A　　　　　FIG 3B

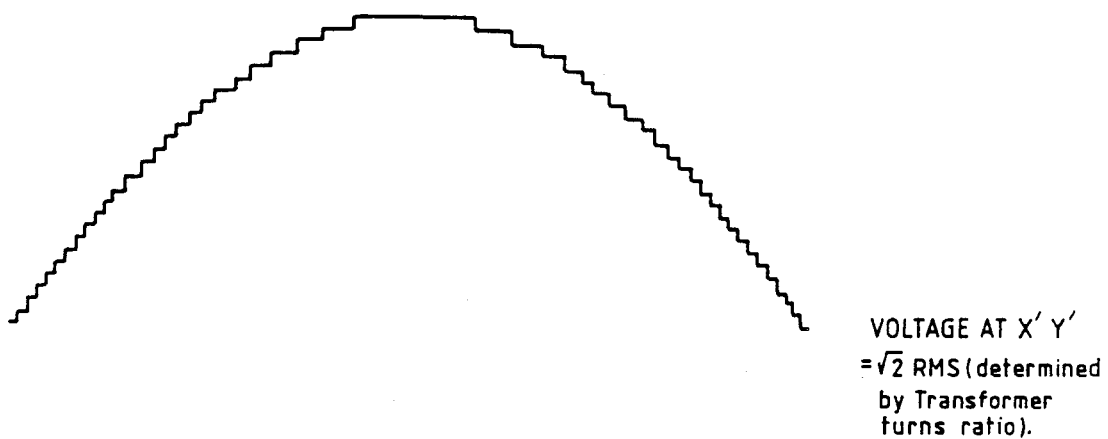
VOLTAGE AT X' Y'
= √2 RMS (determined by Transformer turns ratio).
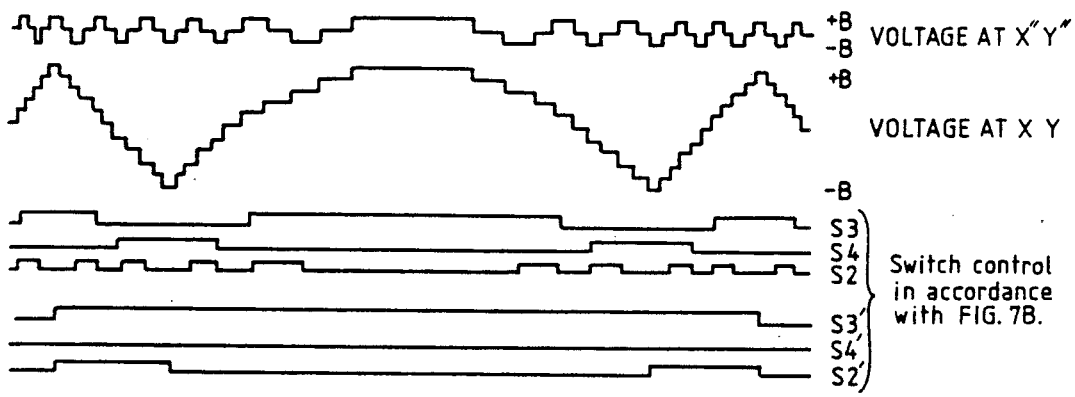
+B / -B VOLTAGE AT X"Y"
+B VOLTAGE AT X Y
-B
S3
S4
S2 } Switch control in accordance with FIG. 7B.
S3'
S4'
S2'
FIG 10D
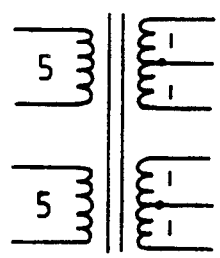
FIG 10E

| STAGE N°. | FUNCTION |
|---|---|
| 1 | $-(k-V_p) \times \phi$ |
| 2 | $(k-V_p) \times \phi$ |
| 3 | $-(-k-V_p) \times \phi$ |
| 4 | $(-k-V_p) \times \phi$ |
| 5 | $-(k-V_p) \times \phi$ |
| -1 | $(-k-V_p) \times \phi$ |
| -2 | $-(-k-V_p) \times \phi$ |
| -3 | $(k-V_p) \times \phi$ |
| -4 | $-(k-V_p) \times \phi$ |
| -5 | $(k-V_p) \times \phi$ |

ELECTRICAL CONVERTER UTILIZING SWITCHED UNI-DIRECTIONAL AND BI-DIRECTIONAL ENERGY SOURCES

FIELD OF THE INVENTION

This invention relates to an electrical converter which can be used for converting AC to DC, DC to AC, or DCs or ACs to supplement the AC generated by an alternator, for balancing three phase loads, for dynamic power conditioning, for load levelling of electric grids, and for other purposes.

Where AC power is required in some areas, for example on board ships, or in small towns or large homesteads, the power supply must be sufficient to meet peak loads and these are often several times average load conditions.

One object of the invention is to provide a converter which can make it unnecessary to have a large generator if the average load is say less than half peak load, so that a much smaller engine and alternator assembly (thereby being of lower cost) is all that is required, providing there is a storage battery system. An object of the invention therefore is to provide a converter, which in some embodiments may function as a rectifier, that is, wherein an alternator can charge batteries, but, in the inverter mode, the battery bank can be used to supplement the output of the alternator when that is required.

SUMMARY OF THE INVENTION

In an embodiment of the invention, a converter device comprises a uni-directional electrical energy source having two ends and a bi-directional energy source having two ends and a centre tap, a pair of conductor rails extending from the uni-directional energy source, a first bridging conductor having two portions extending between said ends of the bi-directional energy source and respective said rails, a second bridging conductor extending between the rails, a first pair of switches one in each said first conductor portion, a second pair of switches in the second bridging conductor portion, an electrical load connected between the centre tap and an electrical conductor between the switches of the second pair, so arranged that, upon selective opening and closing of the switches, current flow in the first said energy source is uni-directional, and in the second said energy source is bi-directional.

In this invention, where current flow is into said uni-directional energy source when the converter is a rectifier and where current flow is out of the said uni-directional energy source when the converter is an inverter.

The uni-directional electrical energy sources herein described are battery banks, which have the advantage that they store energy during low load demands from an alternator (for example), but can supplement the alternator output upon high demand, the converter then being in an inverter mode.

The bi-directional energy sources herein described are also batteries, but since in operation, sometimes the energy storage required is for only one half of a sine wave period (one hundredth of a second for a 50Hz supply), other less expensive devices can be satisfactory.

In one specific embodiment of this invention an AC/DC converter having a DC/AC inverter mode of operation comprises a transformer, a DC power source having a battery or a bank of batteries, a bi-directional second power source and a plurality of switch means, and switch control means, said transformer having a first winding with a centre tap and a second winding, and said DC power source also having a centre tap connected to a first end of the first winding through a said switch, an end of said first winding being connected to a negative rail of said battery or batteries through a first said switch means and to the positive rail thereof through another said switch means, and to a first AC terminal through a further said switch means, said bi-directional second power source/power sink coupled to said second winding,.

said centre tap connecting to a second AC terminal of the converter, the said first AC terminal being referenced to a negative or positive rail of said DC power source through another said switch means, said switch control means being operatively coupled to said switch means to control opening and closing of said switch means in a sequence wherein each switch thereof makes contact before its predecessor switch breaks contact, actuation of each switch occurring when the instantaneous voltage difference across the incoming switch approximates zero as a result of variation of voltage of said bi-directional second power source, and minimal voltage change occurs at that time across said first winding, resulting in no change (or minimal) in voltage at the AC terminals.

While a converter may consist of a single device, in many instances there is advantage in a cascade array of converter devices. Such an array, for example, is required for sine wave AC transmission, and in another embodiment the invention consists of a plurality of devices each embodying the above defined features, and arranged in a cascade array to fire sequentially and produce a stepped wave compatible with a sine wave, and thereby adapted, when connected to an AC power source of the same frequency, to function as an AC to DC converter or a DC to AC inverter.

In a further embodiment of this invention an AC/DC converter having an inverter mode of operation comprises two transformers, a DC power source having a battery or a bank of batteries a bi-directional second power source and a plurality of switch means, and switch control means, said first transformer having a first winding with a centre tap, a second winding, identical with the first winding, and a third winding, a first end of said first winding being connected to a second end of said second winding through a said switch means, said second transformer having a first winding, a second winding and a third winding, wherein the said first and second windings are identical and the third winding end is connected to the two AC terminals, the second end of said first winding of first transformer being connected to a negative rail of said battery or batteries through a said switch means and to the positive rail thereof through another said switch means, and to the first end of the said first winding of the second transformer through a further said switch means, the first end of said second winding of first transformer being connected to said negative rail through a said switch means and to the positive rail through a said switch means, and to second end of said second winding of second transformer through a said switch means, said centre tap of first winding connecting to the second end of the said first winding of second transformer and said centre tap of the second winding connecting to the first end of the said second winding of the second transformer, said bi-directional second power source/power sink coupled to said third winding of first transformer the said first end of the first winding of the second transformer also being referenced to the negative and positive rails through said switches, the said second end of the second winding of the second transformer also being referenced to the negative and positive rails through said switches, said switch control means being operatively coupled to said switches to control opening and closing of said switches in a sequence wherein each switch makes contact before its predecessor switch breaks contact, actuation of each switch occurring when the instantaneous voltage difference across the incoming switch becomes zero (or near zero with different types of semiconductor switches) as a result of variation of the said bi-directional second power source, and so arranged that minimal voltage change occurs at that time across said first and second windings of first transformer, resulting in minimal change in voltage at the AC terminals.

The invention is not limited merely to AC/DC and DC/AC conversion or supplementation, but can be applied in other areas of electrical engineering such as the balancing of the phases of a three phase supply. By utilising three devices each as described hereafter, the invention is equally applicable to a three phase supply, as it is to a single phase supply. Where required, it could also be used for a two phase supply.

An embodiment of the invention is described hereunder in some detail with reference to, and is illustrated in the accompanying drawings, in which:

BRIEF DESCRIPTION OF THE DRAWINGS

FIG. 1A shows the designation used herein for a bi-directional energy source (which need not necessarily be a battery), FIG. 1B diagrammatically shows the bi-directional energy source when it comprises a battery with individually switched cells, FIG. 2A is a non-practical diagram which serves to explain the underlying theory of the invention, FIG. 2B is a similar diagram (but showing the relationship of batteries B1 and B2 connected in the opposite sense), FIG. 3A is a diagram similar to FIG. 2A but showing battery B2 isolated from battery B1 by a transformer T1, FIG. 3B is a diagram similar to FIG. 2B but showing battery B2 isolated from battery B1 by a transformer T1, FIG. 10D shows a stepped sine wave at the AC outputs of a system of two converters as connected in FIG. 10B, and FIG. 10E shows the transformer connections between stages 1 and 2 of FIG. 10B.

DESCRIPTION OF THE PREFERRED EMBODIMENTS

Many of the accompanying diagrams use the symbol of FIG. 1A which represents a variable voltage source/sink derived from a battery B2 as shown in FIG. 1B. Voltage variations are by means of steps so as to produce a "staircases waveform, although for simplicity the wave forms are not herein illustrated (except in FIG. 10A).

The converter concept is based on FIGS. 2A and 2B. In FIG. 2A the battery B2 is in series with battery B1 but in the reverse sense such that the voltage at the output terminals X and Y is less than voltage VB1 provided that the maximum value of voltage $V_{B2}$ does not exceed voltage $V_{B1}$. In this configuration the load current 1 charges B2 and discharges B1. In FIG. 2B battery B2 is connected in the forward sense such that an increase in the value of $V_{B2}$ increases the voltage across the load Here, both batteries will be discharged.

FIGS. 3A and 3B are derived from FIGS. 2A and 2B respectively. The function of the transformer T1 is to alter the magnitude of the steps in $V_{B2}$ and to isolate batteries B1 and B2 but, during voltage change, the action of B2 is the same as in the previous oases (ignoring non-ideal transformer characteristics).

Figure 4A:
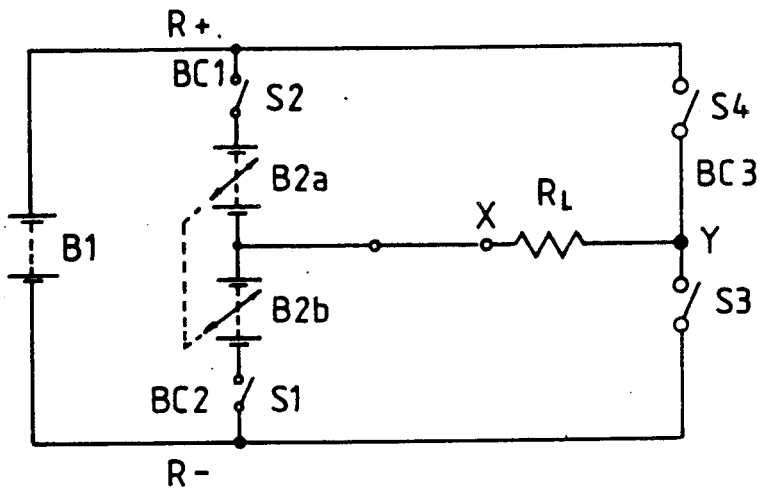
FIG. 4A is a diagram of a practical converter device showing four switches which, when closed in a sequence described hereunder, control actuation of the device in an inverter mode, but is also usable in the rectifier mode, FIG. 4B graphically illustrates the wave forms at the uni-directional energy source B2 and the output terminals X and Y of the device
Figure 4B:
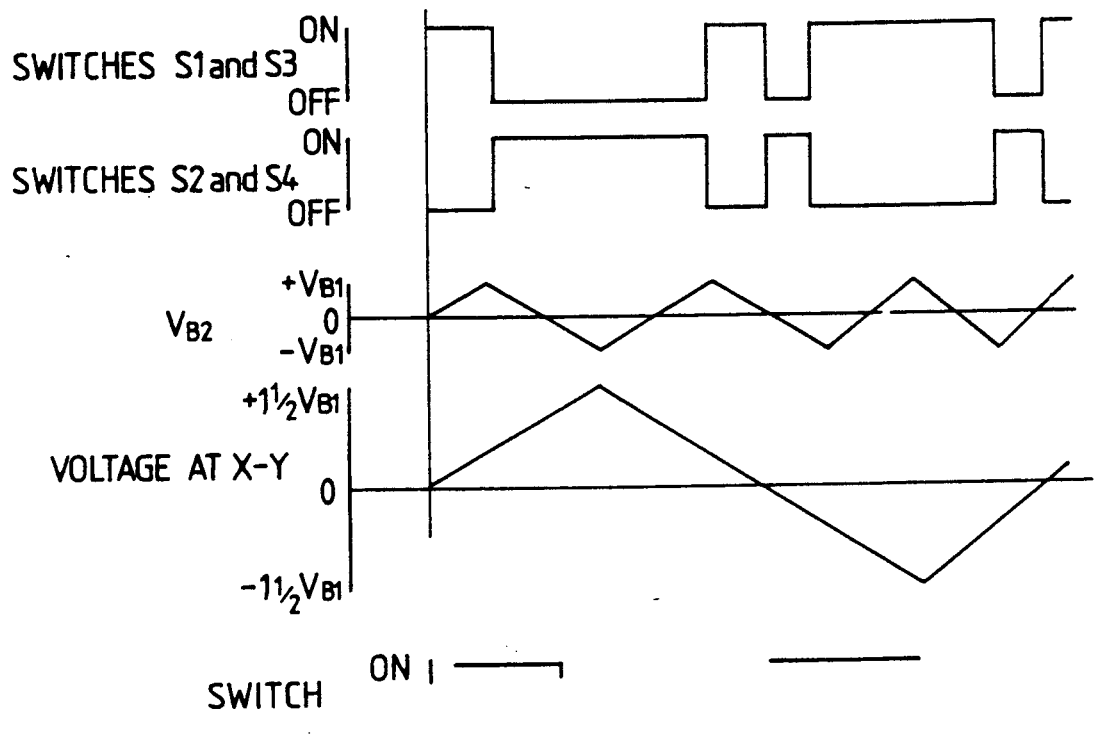

In FIG. 4A, battery B1 has rails R+ and R−, and battery B2 is divided into two components which are always equal and $(V_{B2a} + V_{B2b}) \leq V_{B1}$. $V_{B1}$ is connected through bridging conductor portions BC1 and BC2 to rails R+ and R− through switches S2 and S1 respectively. Bridging conductor BC3 bridges rails R+ and R− through switches S4 and S3 respectively. With switches S1 and S3 closed the voltage at the load RL is directly proportional to $V_{B2b}$. With switches S2 and S4 closed the voltage at the load is given by $V_{B1} \pm V_{B2a}$ FIG. 4b shows (in simplified form) the resultant waveform that will be obtained across the load. Switches S1 and S2 should be "make before break" action so as to preserve continuity of output during switching. The switches are controlled to change over when $V_{B2} = V_{B1}$ and therefore at that instant no current will circulate around the loop formed by B1, B2a and B2b whilst S1 and S2 are both closed as the operation of B2 changes from discharge to charge. Switches S3 and S4 switch over at zero VRL (voltage at load RL) to reference the load alternately to the negative and positive terminals of B1 thus producing a bipolar output. It should be noted that when S1 and S3 change over to S2 and S4, the switch must be a "break before make" action so that the battery B1 does not short circuit.

Figure 5:
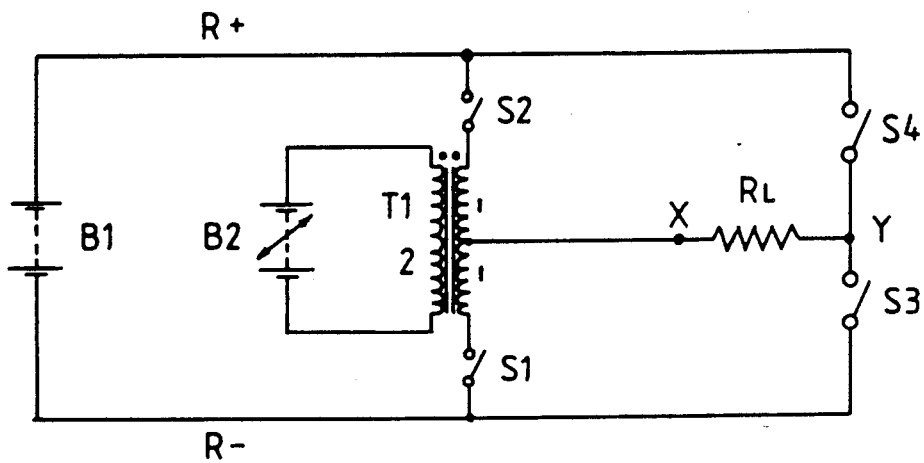
FIG. 5 is a diagram corresponding to FIG. 4A, but showing battery B2 isolated from battery B1 by a transformer T1 (as in FIGS. 3A and 3B), these wave forms being also valid if the load is a generator.

In FIG. 5, the dual battery B2a and B2b of FIG. 4A are replaced by a single battery B2 and transformer T1 which has a centre tapped secondary.

The required transformer ratio to produce $\pm 1/2 V_{B1}$ across each half of the centre tapped secondary is 2:1:1. The resultant waveform appearing at the output terminals X and Y is the same as FIG. 4B.

Figure 6:
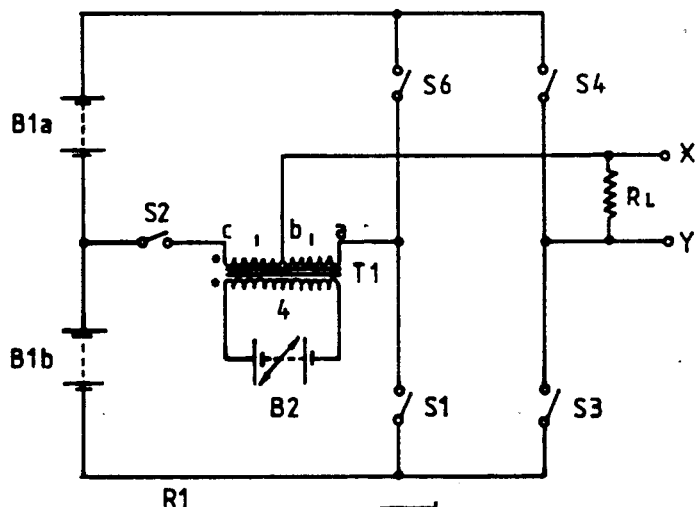
FIG. 6 is a diagram similar to FIG. 5 but showing a centre-tap battery B1 having two portions B1a and B1b connected to transformer T1 through switch S2.

The concept is extended by using a centre-tapped battery B1 as shown in FIG. 6.

FIG. 6 is derived from FIG. 5 by centre tapping battery B1 and connecting S2 to that centre tap, by connecting a new switch S6, from the battery B1 positive to switch S1, and by changing T1 turns ratio to 4:1:1 where B2 <B1 as before.

In FIG. 6, the peak voltage across each half of the transformer secondary winding is one quarter of $V_{B1}$, and it follows that the peak positive voltage that can appear across the load $RL \pm 1\frac{1}{4} V_{B1}$ as shown in FIG. 6B.

The following is the switch sequence for FIG. 6:

(a) The first switch sequence is from centre tap of secondary winding b to X, through load RL, switch S1 and switch S3 back to secondary winding, terminal 'a'. Energy is derived from B2.

(b) Next switch sequence is b to x, through RL, switch S3, battery portion B1b, S2 to connection C on T1 winding. Voltage at RL is then proportional to voltage of B1b plus or minus $\frac{1}{4}$ voltage of B2.

(c) Next switch sequence is b to x, through RL, through S3, B1b and B1a, S6 to connection of a T1. Voltage produced across RL equals B1a+B1b, plus or minus $\frac{1}{4}$B2.

These sequences are reversed back to (b) then to (a).

For Negative Half-cycle:

(d) The first switch sequence is from centre tap b of transformer T1 to X, through load RL, switch S4 switch S6, back to terminal a of transformer T1.

(e) The next sequence is b to x, through RL, through S4, through B1a, through S2 to C on T1 winding. Voltage across RL =B1a plus or minus $\frac{1}{4}$B2.

(f) The final sequence is from b to x, through RL, through S4, through B1a, B1b, S1, to conversion of a T1. Voltage across RL =B1a,−B1b, plus or minus $\frac{1}{4}$ B2.

These sequences are reversed back to (e) then (d).

Figure 7A:
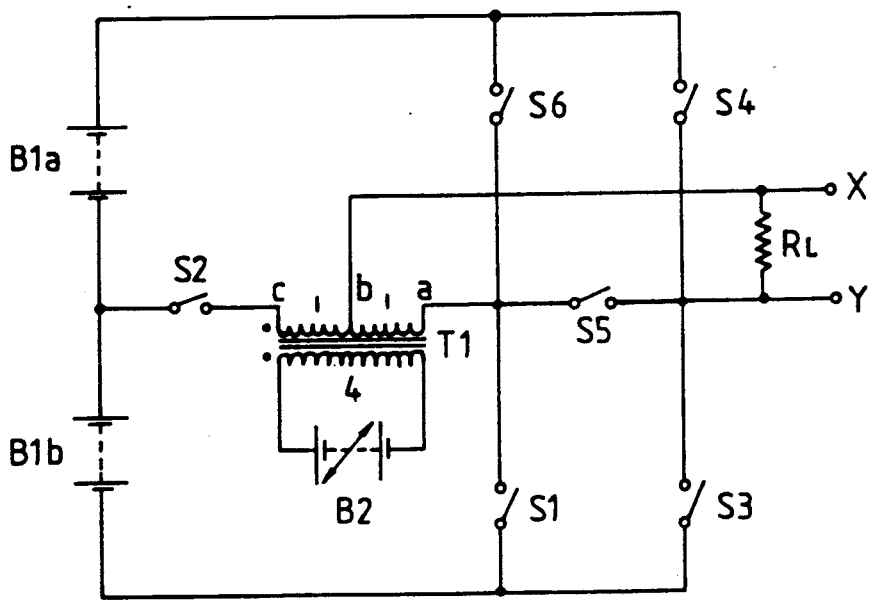
FIG. 7A is a diagram corresponding to FIG. 6 but showing a further switch (S5) which avoids danger of short circuit of battery B1 in the event that the other switches "make before break"

A further innovation is provided by switch S5 in FIG. 7A. Most real loads do have an inductive component such that when the voltage produced by FIG. 6 is zero, there may still be a reactive current flowing. At this time as shown in FIG. 6B, S1 and S3 switch over to S6 and S4 (or vice versa) but not before a "make before break" action. The inclusion of S5 results in a switching sequence that allows all switch overs to occur with a "make before break" action. This results because the switch combination S1 and S3 plus the switch combination S6 and S4 in FIG. 6 no longer occur. This has been taken over by S5 as shown in FIG. 7A. Thus the switching sequence S1 to S6 and S3 to S4 no longer occurs and the short circuit problem Will not occur because of a "make before break" switch action. The following is the switch sequence for FIG. 7A:

For Positive Half-cycle:

(a) The first switch sequence is from centre tap of secondary winding 6 to X, through load RL, switch S5 back to secondary winding, terminal 'a'. Energy is derived from B2.

(b) Next switch sequence is b to x, through RL, switch S3, battery portion B1b, S2 to connection C on T1 winding. Voltage at RL is then proportional to voltage of B1b plus or minus ¼ voltage of B2.

(c) Next switch sequence is b to x, through RL, through S3, B1b and B1a, S6 to connection of a T1. Voltage produced across RL equals B1a+B1b, plus or minus ¼ B2.

These sequences are reversed back to (b) then to (a).

For Negative Half-cycle:

(d) The first sequence is identical to (a) above.

(e) The next sequence is b to x, through RL, through S4, through B1a, through S2 to C on T1 winding. Voltage across RL =B1a plus or minus ¼B2.

(f) The final sequence is from b to x, through RL, through S4, through B1a, B1b, S1, to conversion of a T1. Voltage across RL −B1a, −B1b, plus or minus ¼B2.

These sequences are reversed back to (e) then (d).

Figure 7B:
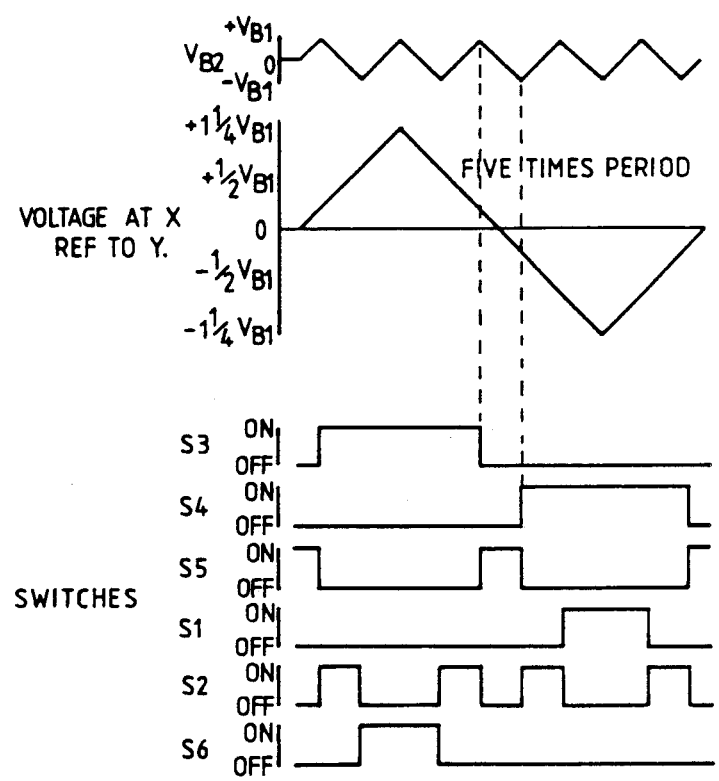
FIG. 7B illustrates the alternative switch firing sequence to achieve similar voltages with the inclusion of S5 in FIG. A, FIG. 8 a more elaborate device circuit wherein the centre-tap of battery B1 of FIG. 7A is eliminated.

The waveform resulting from FIG. 7A is shown in FIG. 7B. The current flow path sequence through the switches and RL is now S5 to S2 and S3 then to S6 and S3 then back to S2 and S3 and then back to S5, then to S2 and S4, then to S1 and S4 then back to S2 and S4 and then back to S5.

The period of $V_{B2}$ is one fifth that of the output. All switches are switched into and out of circuit with zero volts across them.

Figure 8:
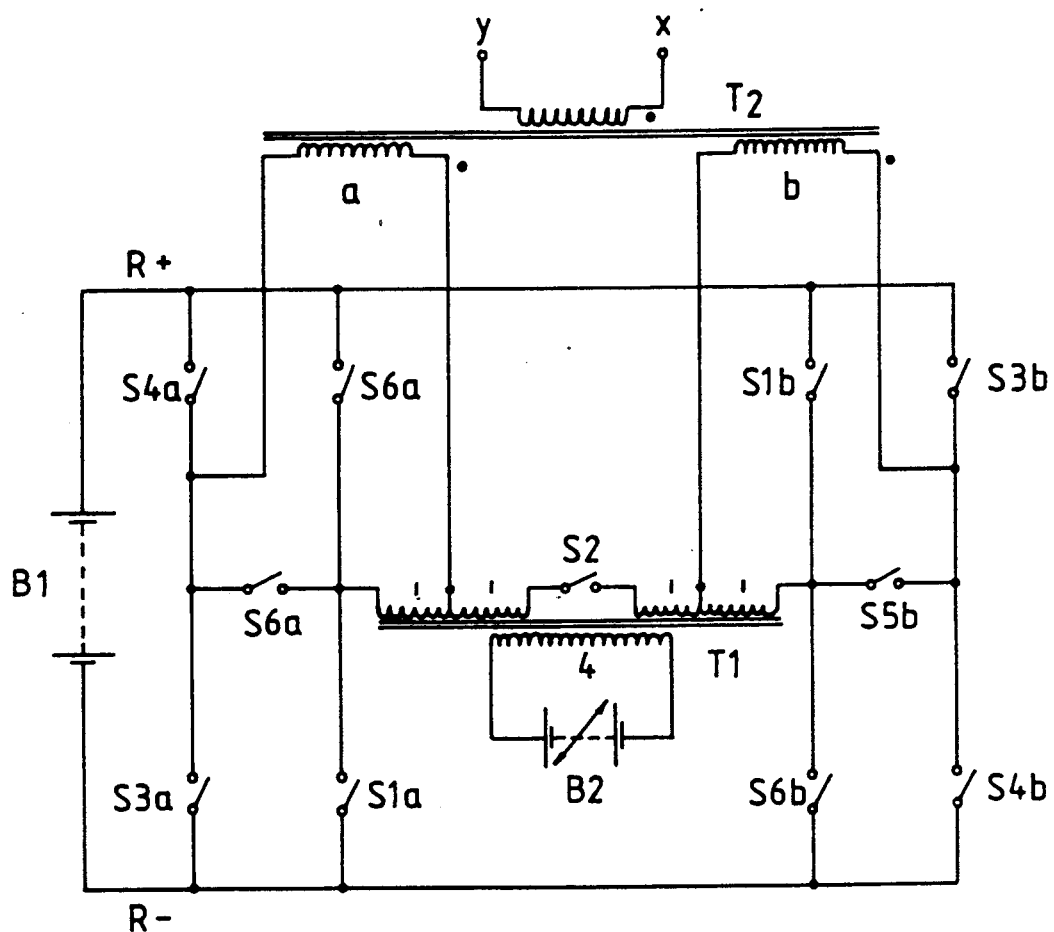

In a further embodiment, the battery centre tap of FIG. 7A is eliminated as shown in FIG. 8. This is achieved by having effectively two stages of FIG. 7A operating in series/parallel but 180° out of phase. Switches S1a and S1b are operated together as are S3a and S3b etc. The battery centre tap is eliminated because the two stages "a" and "b" are operated in series when S2 is closed with the current path being S3a, transformer 1a, winding of T1, S2, winding T1, winding B of T2, S3b or S4a, S2, S4b. The close coupling of the two windings a and b of T2 ensure equal voltage division of the two stages. The operation of the switches is the same as in FIG. 7B. Since the "b" switches are connected in reverse polarity to battery B1, the "a" and "b" stages are 180° out of phase. The series/parallel at the output is achieved through the transformer T2. The battery centre tap is eliminated because the two stages of FIG. 7A are in series across battery B1 when S2 is closed with exactly 50% voltage division across each stage. Hence, no power would flow into or out of the battery centre tap if it were connected.

The circuit of FIG. 8 has a number of features.

The explanation of FIG. 7A is relevant.

1. The voltage across the open switches except for S2 does not exceed $V_{B1}$. The voltage across S2 reaches twice $V_{B1}$.

2. The frequency of $V_{B2}$ is five times that at the output terminals x and y.

3. The peak input/output power of B2 is one fifth the output power at x and y.

4. The switches are all switched into and out of circuit with zero volts across them.

5. For a given total output power in FIG. 8, the current rating of the switches is halved since each half of the circuit generates half of the output power.

6. The size of the transformer T1 is small in comparison to the output transformer T2 since it handles only one fifth of the total output power and operates at five times the frequency.

Also, for a sine wave there will always be a fundamental component present in T1 the magnitude of which is a function of the output voltage amplitude. (This is explained hereunder). Dynamic voltage control is effected by decreasing the number of steps in the output waveform by switch control means and/or by the time occurrence of each step.

Figure 9A:
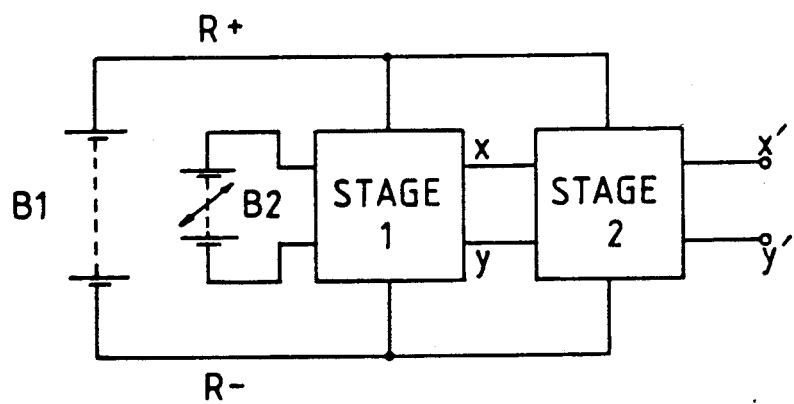
FIG. 9A shows two converter devices (each of which can be in accordance with any one of FIGS. 5, 6, 7A or 8) arranged in a cascade array.
Figure 9B:
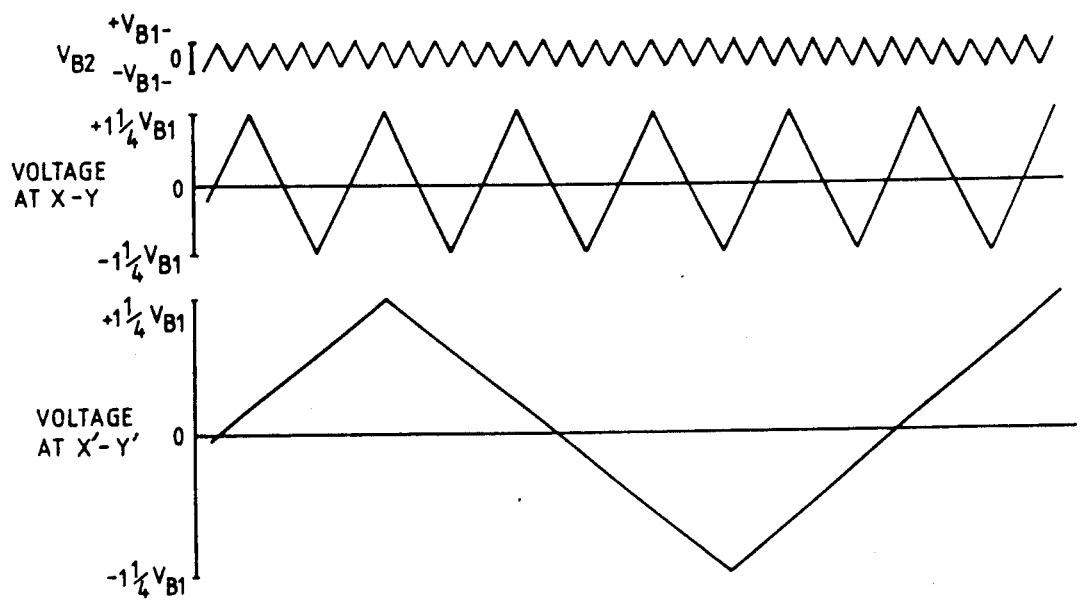
FIG. 9B shows the frequencies and voltages at batteries B and B2, and the output at X and Y, of the FIG. 9A cascade array.

Several circuits similar to FIG. 8 may be cascaded in order to increase the number of steps which make up the output waveform. A two stage arrangement is shown in FIG. 9A and the corresponding waveforms are shown in FIG. 9B.

Figure 10A:
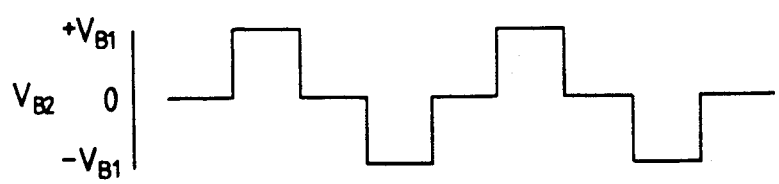
FIG. 10A shows a simple wave form imparted to battery B2 of FIG. 9A in another cascade array.
Figure 10B:
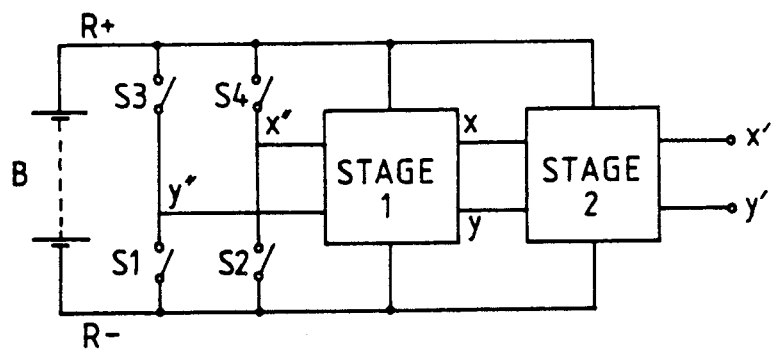
FIG. 10B shows the cascade array associated with FIG. 10A.
Figure 10C:
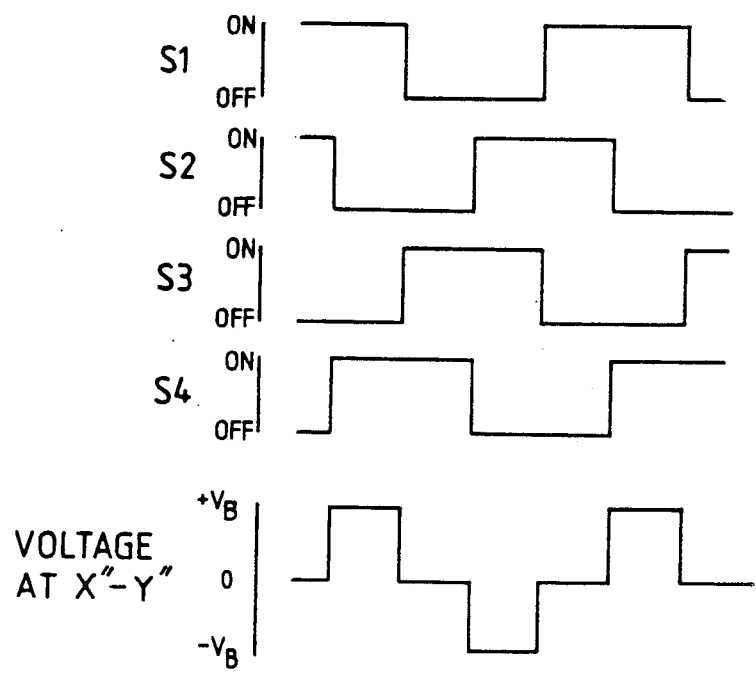
FIG. 10C shows the closing sequence of switches S1 to S4 of FIG. 10B and the output voltage at terminals X' and Y'.

As $V_{B2}$ now constitutes a minor part of the output waveform, it can be replaced by the simple stepped waveform shown in FIG. 10A and is generated by the circuit of FIG. 10B. Switches S1, S2, S3, and S4 of FIG. 10B breach the ideal that all switches be opened or closed with zero volts across them. However, as this stage operates at only a small fraction of the total output power, the associated complexities and problems are scaled down. The switching order is shown in FIG. 10C.

In practice the switches in stage 1 and stage 2 and S1, S2, S3, and S4 of FIG. 10B are made up from semiconductor switches, that is thyristors, (or silicon controlled rectifiers (SCR), although it is not limited to SCR's. Transistors or other devices could be used). Thyristors capable of withstanding continuous voltages exceeding 4000 volts with RMS current ratings exceeding 3000 amps are available.

The thyristor, which conducts current in one direction only, has two stable states — on and off. A single low voltage low current trigger pulse is all that is required to latch the thyristor on. It then remains on until the voltage across its anode and cathode is held at zero volts for a small time. This time is to allow the electrons and holes in the vicinity of the junctions of the pnpn structure of the thyristor to diffuse so that it is rendered open circuit. This turn-off time is very much reduced by applying a reverse voltage across the anode and cathode terminals. This reverse voltage must be high enough and for long enough to ensure that the thyristor turns off under the worst case conditions. Turn off time increases a the junction temperature increases and as the forward anode current to be turned off (i.e. commutated) increases.

A sine wave output illustrated in FIG. 10D is produced by sequencing the switches with a variable period determined by the control circuitry (FIG. 11) and the devices configuration of FIG. 10B. The voltage at x" y" is produced as in FIG. 10A and by FIG. 10C. The timing of the switches is also shown in FIG. 10D to show their relative timings. Some switches are not shown here but their relationship is as shown in FIG. 7B. T1 (as in FIG. 8) in stage 2 of FIG. 10B would have a transformer ratio of 5:1:1 as the voltage at x and y is −1¼VB. T2 in stage 1 and T1 in stage 2 can be a common transformer instead of two separate transformers and their ratios would be as illustrated in FIG. 10E such that the peak voltage produced across the outer connection of each centre tapped winding =½ VB.

Figure 11:
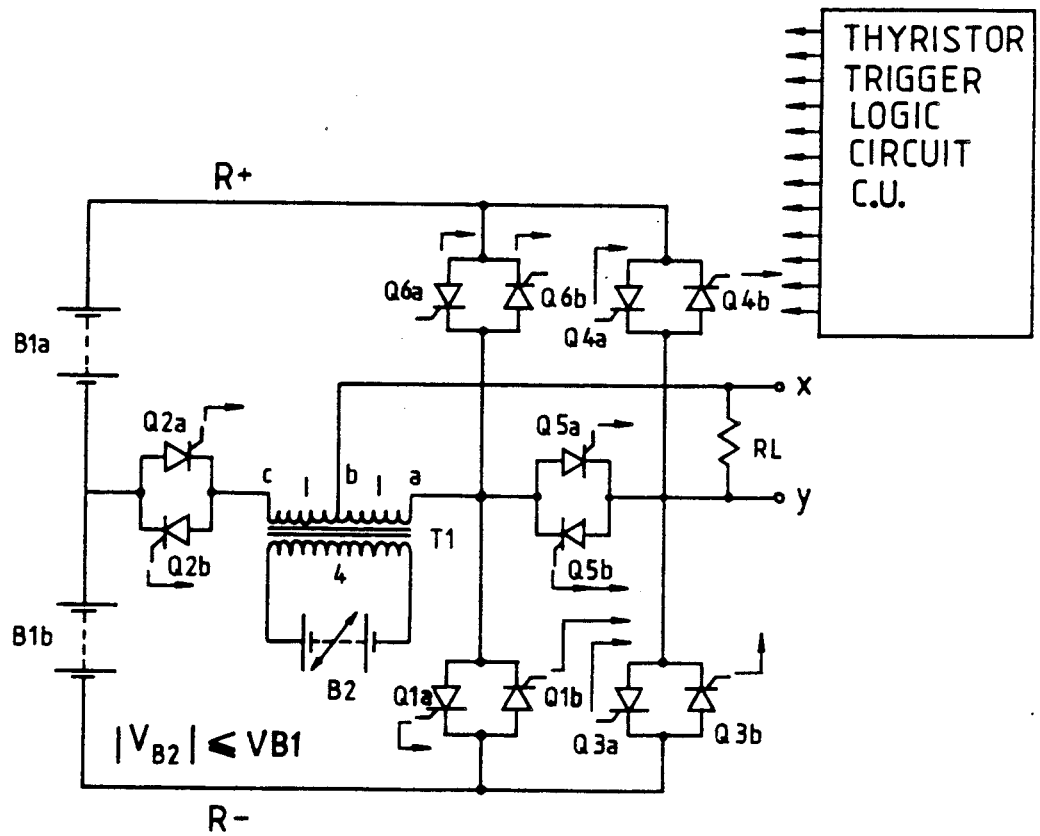
FIG. 11 shows in more specific details the thyristor switching which would be used in FIG. 7A, and the trigger logic circuit.

Each switch used in FIG. 7A has been replaced with a pair of "back to back" thyristors in FIG. 11. A pair of thyristors must be used in order to allow current flow to be controlled in both directions since the given battery voltage source may be charged or discharged during the various phases of the output cycle. In fact the whole convertor concept is bi-directional. Control is effected by known art methods, using control unit CU having logic circuit which triggers the thyristors Q1a, Q1b, Q2a, Q2b, Q3a, Q3b, Q4a, Q5a, Q5b, Q6a, Q6b. Where timing is required this is best achieved with a crystal oscillator and a frequency divided circuit. Such circuits are well known.

There are four possible conditions to consider when "toggling" between one pair of thyristors and another pair. Four conditions are analysed for toggling between thyristors 2a/2b and 3a/3b in FIG. 12A (compare FIG. 7A). Note the corresponding positions of Q2a, Q2b, Q3a and Q3b in FIGS. 11 and 12a. Transformer T1 has been omitted for clarity, $|V_{B2}| \leq |V_{B1a}|$.

Condition 1: Resistive external load

Figure 12A:
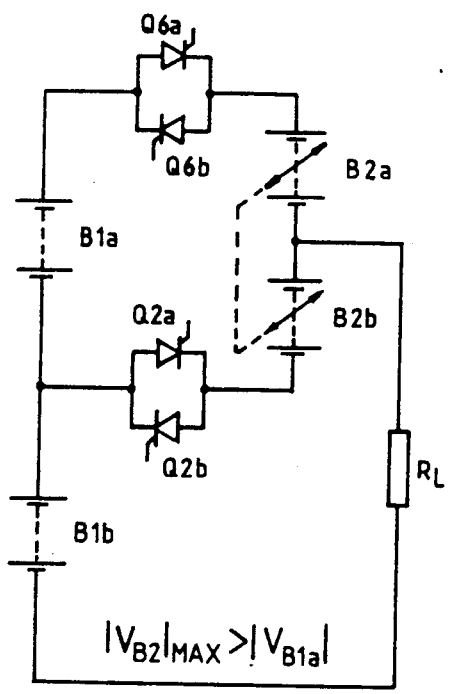
FIG. 12A illustrates a condition which exists prior to "toggling" the thyristors of one pair to another.
Figure 12B:
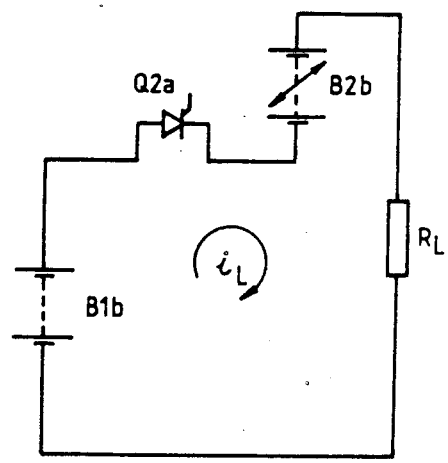
FIG. 12B shows a condition wherein a thyristor (Q2a) conducts.

In FIG. 12A, Q6a/Q6b are to be brought into circuit and Q2a/Q2b are to be taken out of circuit. Prior to this, current flow is as per the circuit of FIG. 12B.

Figure 12C:
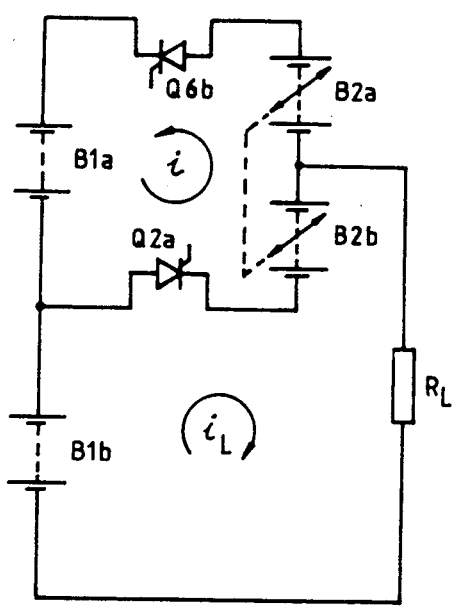
FIG. 12C shows a possible flow of undesirable current from battery B2 into battery B1a (which is to be avoided)

If Q6a/Q6b were triggered when $(V_{B2a}+V_{B2b})>V_{B1a}$, there would be two current paths. Current would continue to flow from B1b to the load through Q2a but a very high undesirable current would flow from B2 into B1a through Q2a and Q3b as shown in FIG. 12C.

Figure 12D:
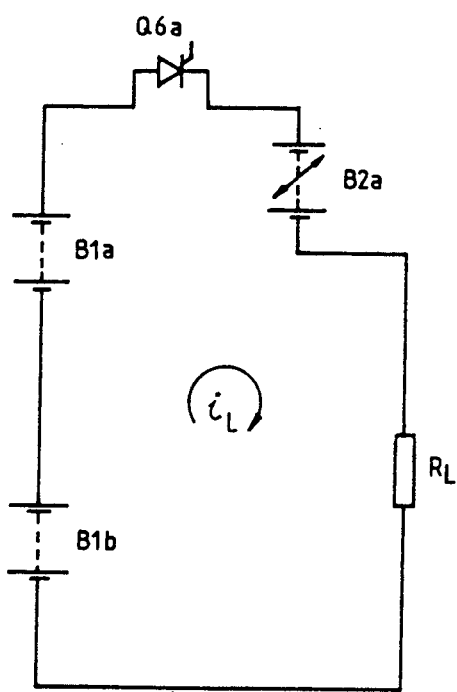
FIG. 12D shows a flow of current through thyristor Q6a, FIG. 13A shows the condition wherein thyristors Q3a/Q3b are to be brought into circuit while thyristors Q2a/Q2b are to be taken out of circuit.

This solution to this problem is not to trigger Q6a/Q6b when $V_{B2}$ is at a maximum but to quickly ramp $V_{B2}$ down at maximum pace until $(V_{B2a}+V_{B2b})<V_{B1a}$ and then trigger Q6a/ Q6b. At this point the load current will begin to flow through Q6a as shown in FIG. 12D while Q2a will be commutated due to the reverse voltage now appearing across it $(V_{B1a}-V_{B2}$ when $V_{B1a}>V_{B2})$.

After sufficient time has been allowed for commutation, the converter logic circuits return to their normal sequence. The small ramp down will appear as a small pulse on the output waveform at the load. This mode of commutation is hereunder called an "unforced" commutation since it was not forced to occur by the additional voltage available from $V_{B2}$ for the purpose (see condition 2).

Condition 2: Resistive External Load

Q2a/Q2b are to be brought into circuit and Q6a/Q6b are to be taken out of circuit. Prior to this, current flow is as per the circuit of FIG. 12D.

Q2a/Q2b are triggered when VB2 is at a maximum, i.e. $(V_{B2a}+V_{B2b})>V_{b1a}$. Q2a now forward conducts current to the load as per FIG. 12B while the additional voltage from $V_{B2}$ appears as a reverse bias across Q6a and commutates it. As Q2a comes into circuit a small voltage pedestal given by $(V_{B1a}-V_{B2})$ will appear across the load for a duration of one step of the output waveform. This mode of commutation will from hereon be called a "forced" commutation since it was forced to occur due to the additional voltage available from $V_{B2}$ for the purpose.

Figure 13A:
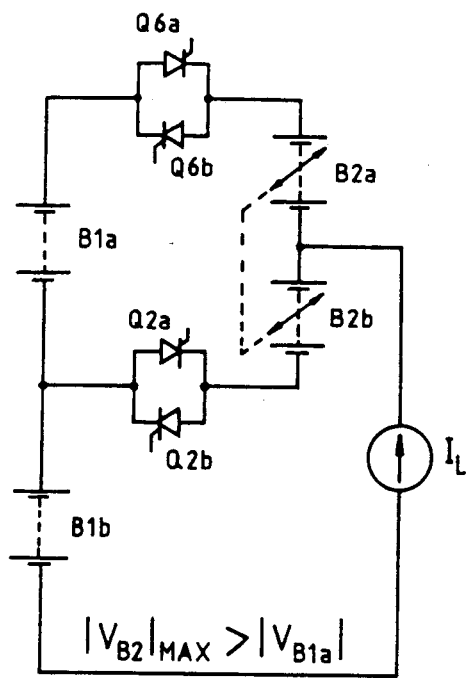
FIG. 13B illustrates the current flow immediately before the condition of FIG. 13A, FIG. 13C corresponds to FIG. 12C wherein undesirable current flow from battery B2 into battery B1 must be avoided, FIG. 13D corresponds to FIG. 12D (but with reverse current flow)

Condition 3: The load is a current source causing current to flow into the converter In FIG. 13A as in condition 1, Q6a/Q6b are to be brought into circuit while Q2a/Q2b are to be taken out of circuit. Prior to this, current flow is as per the circuit of FIG. 13B.

Figure 13B:
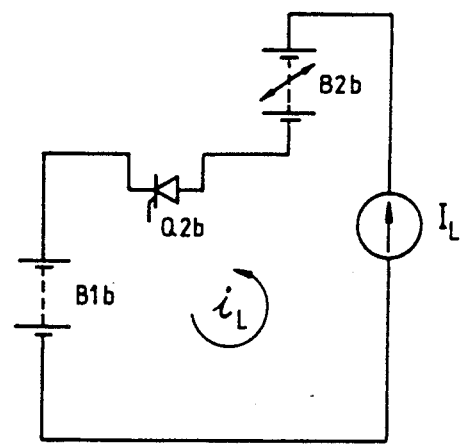

Q6a/Q6b are triggered when VB2 is at a maximum, i.e. $(V_{B2a}+V_{B2b})>V_{B1a}$. Q6a now forward conducts current from the load as per FIG. 13D while the additional voltage from $V_{B2}$ appears as a reverse bias across Q2b and commutates it. As Q6a comes into circuit a small voltage drop given by $(V_{B2a}-V_{B2})$ will appear across the load for a duration of one step of the output waveform. This is a "forced" commutation as per condition 2.

Condition 4: The load is a current source causing current to flow into the converter As in condition 2, Q2a/Q2b are to be brought into circuit while Q6a/Q6b are to be taken out of circuit. Prior to this, current flow is as per the circuit of FIG. 13D.

Figure 13C:
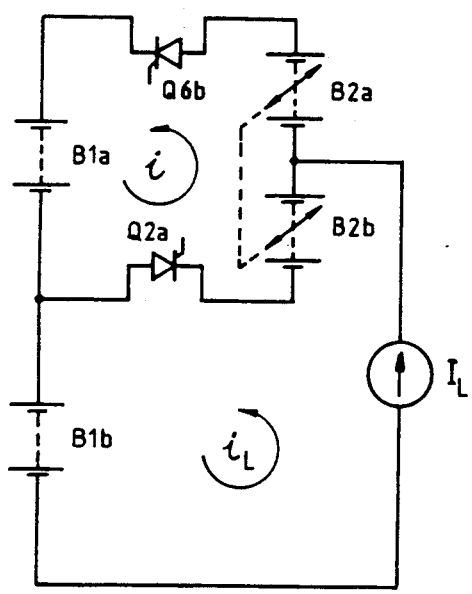
Figure 13D:
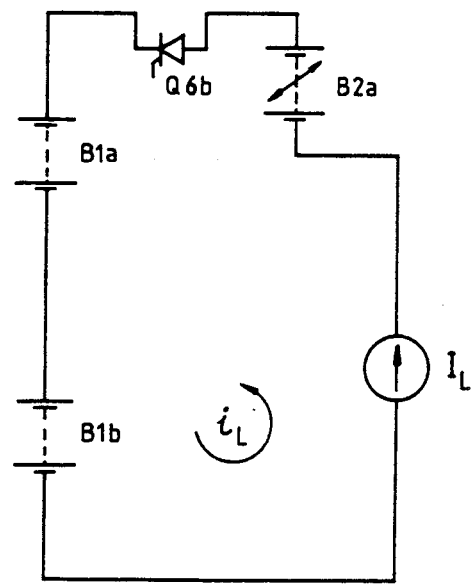

If Q2a/Q2b were triggered when $(V_{B2a}+V_{B2b})>V_{B1a}$, there would be two current paths. Current would continue to flow from the load via Q6b into B1b but a very high undesirable current would flow from B2 into B1a through Q2a and Q3b as shown in FIG. 13C.

As in condition 1, the solution to the problem is not to trigger Q2a/Q2b when $V_{B2}$ is at a maximum but to quickly ramp $V_{B2}$ down at maximum pace until $(V_{B2a}+V_{B2b})<V_{B1a}$ once again and then trigger Q2a/Q2b. At this point, current from the external current source will begin to flow through Q2b as shown in FIG. 13B while Q6b will be commutated due to the reverse voltage now appearing across it $(V_{B1a}-V_{B2}$ where $V_{B1a}>V_{B2})$. The small ramp down will appear as a small pulse on the output voltage waveform. This is an "unforced" commutation as per condition 1.

The four switches in FIG. 10B have been termed the exciter stage, stage 1 the driver stage and stage 2 the output stage.

TRANSFORMER ANTISATURATION SYSTEMS

Figure 14:
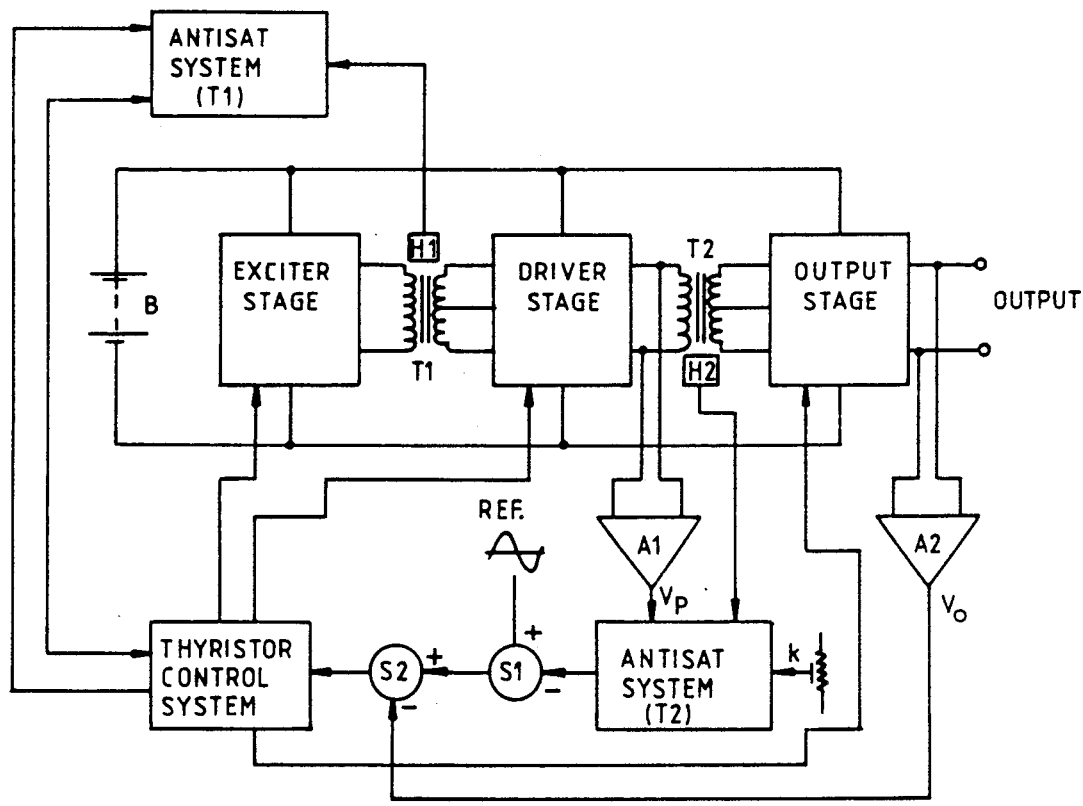
FIG. 14 is a block diagram of a systems configuration particularly showing transformer antisaturation.

The three stage configuration of the converter concept requires two interstage transformers as shown in the block diagram of FIG. 14. The negative feedback loop derived from the output is required in order to maintain the magnitude, frequency and waveshape of the output voltage. However, a serious side effect of negative feedback in a system that is capable of instantaneously changing its output level is that it will always tend to saturate any transformer within the loop by introducing DC components to the AC waveform. An antisaturation system, which takes into account the peculiarities of the prevailing primary waveform is required for each transformer. The following sections describe the waveforms appearing across the primary windings of each transformer and the associated antisaturation systems.

DRIVER — OUTPUT TRANSFORMER (T2 of FIG. 14)

If the integral of the primary voltage waveform of T (FIG. 8) over one full output voltage cycle is non-zero, there will exist a DC component which will tend to saturate the magnetic core. In order to force this DC component to zero, the antisaturation system must be able to vary the average area of the primary waveform that is above and below zero volts. However, amplitude control is difficult except at the points marked "x" and attempting to control these would introduce unacceptable distortion of the output waveform.

Figure 15:
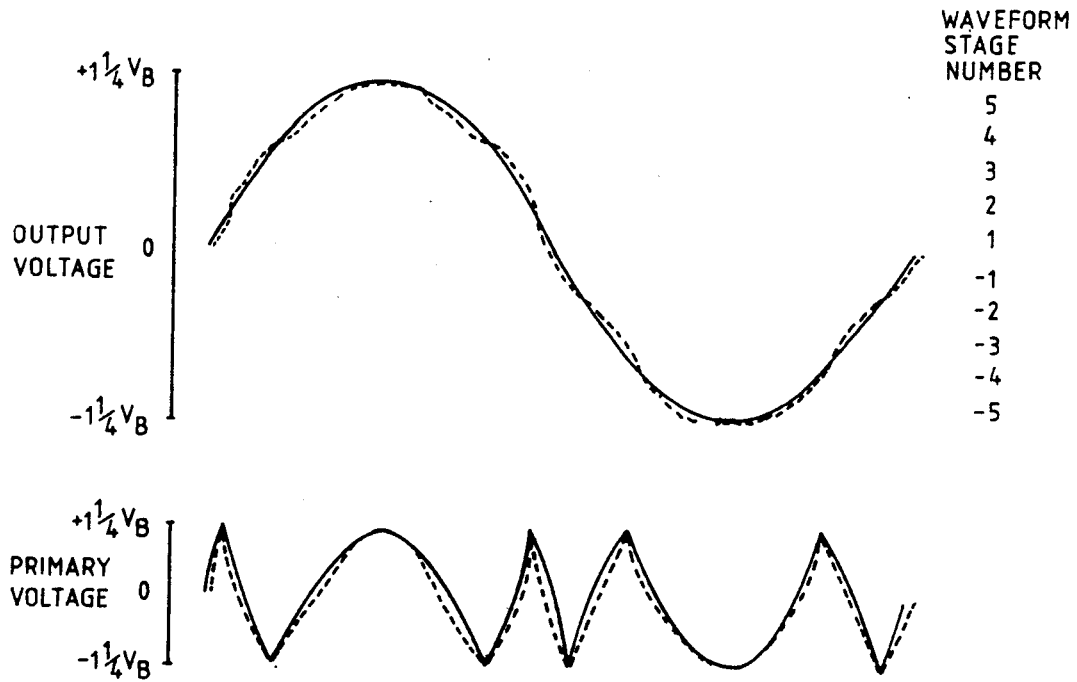
FIG. 15 shows induced output wave form distortion required to reduce DC component in the transformer T2 in FIG. 14.

Another method to control the DC component is shown in FIG. 15. In this example the area of the primary waveform below zero has been increased and that above zero has been decreased so as to produce a nett negative DC component. Only the zero crossing points have been moved while the peaks of the waveform are unaffected. Note that the resultant output waveform distortion is quite small and consists of high order harmonics. In order to cause this distortion when required, the sine wave reference signal for the main converter feedback loop (FIG. 14) must be modified with a mathematical function which varies according to which of ten amplitude levels that the converter output waveform occupies at any instant. The function, detailed in FIG. 16A, contains three factors:

1. The core flux (o) of T2 the average of which is to be controlled to zero. The flux signal is derived from a small hall effect sensor (H2) embedded in the core of T2.

2. The primary voltage (Vp) which is sampled via the differential amplifier A1 in FIG. 14.

3. A constant (k) which is normally preset to be equal to the peak value of Vp.

Inspection of this function shows that it has maximum effect when Vp=0 and when the flux offset (o) is greatest as required. The function has no effect when $|Vp|=|K|$, m.e. at the peaks of the primary waveform. The arithmetic signals have been chosen so as to produce negative feedback for all ten amplitude "stages".

Figures 16A, 16B:
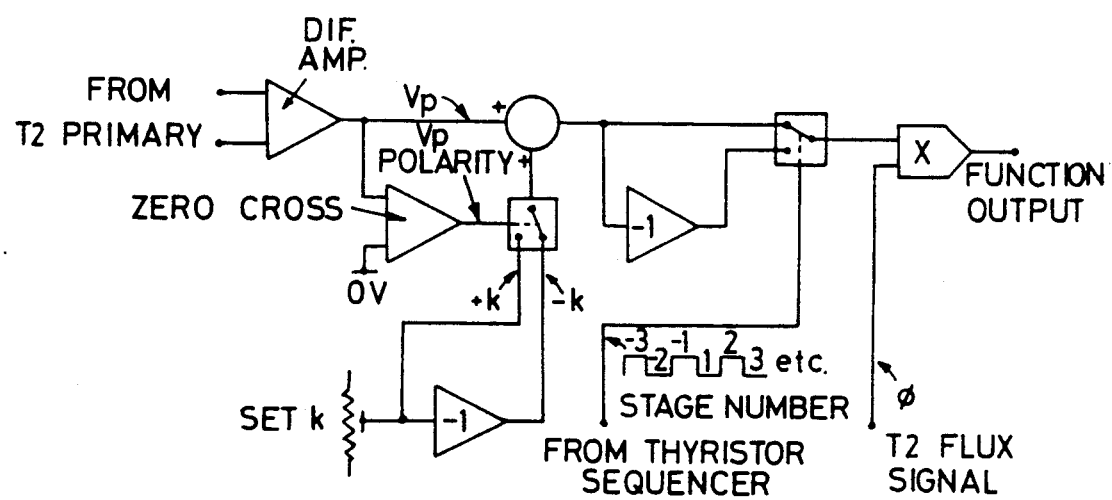
FIG. 16A is a table showing stages of magnitude of DC component correction.
FIG. 16B is a control circuit which produces DC component corrections for transformer T2 in FIG. 14.

From FIGS. 15 and 16A it can be seen that the sign of k follows the polarity of the primary voltage waveform and that the polarity of the overall function alternates with each "stage" number. A system which will generate the functions of FIG. 16A is shown in FIG. 16B. The output of this system is summed with the converter since wave reference signal as shown in FIG. 14.

EXCITER — DRIVER TRANSFORMER

Figure 6A:
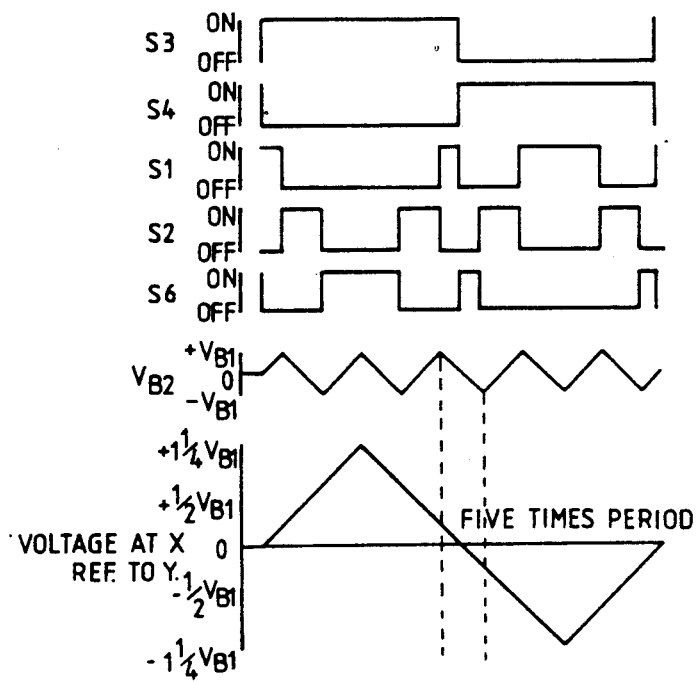
FIG. 6A illustrates the voltage at battery B2 and the voltage at output terminals X and Y, when the device of FIG. 6 is operated in inverter mode, and the switch firing sequence to achieve those voltages.

In order to generate the triangular output waveforms from the driver and output stages, the exciter waveform is as shown in FIG. 6A. However, if the converter output is made to track a sine wave as in FIG. 14, then the exciter output waveform at the primary of T1 will become very asymmetrical and will be at its worst at the peaks of the converter output sine wave. This asymmetry combined with the effects of negative feedback would cause a large DC voltage component across the primary of T1.

Before describing a solution it would be advantageous to reconsider how the converter tracks the reference sine wave (see main feedback loop section for more detail). In FIG. 14, a sample of the output waveform ($V_o$) is compared in a difference amplifier (S2) with the sine wave reference signal and the error signal is passed on to the analog section of the thyristor control system. The latter system has two voltage comparators which set an upper and lower limit for the error signal from S2. The two comparators in effect present a "window" in which the error signal can remain without causing the thyristor control system to react. However, if the error signal became too large in the positive direction and it crossed the upper window limit, the thyristor control system would count down until the error was back within the confines of the window. Similarly, if the error became too large in the negative direction it would cross the lower (negative) window threshold and cause the thyristor control system to count up. Normally this window is fixed in dimensions (i.e. fixed thresholds) but the T1 antisaturation system requires that the window can be collapsed or expanded by simply varying a control voltage. It should be noted that if the window is collapsed then the control loop will become more sensitive to any error signal present (positive or negative) and will cause the thyristor control system to count up or down a fraction "earlier" than normal. Similarly, if the window is expanded, the thyristor control system will be delayed a little before counting up or down.

There are three factors which determine then and in which direction the thyristor control system should count when acted upon by the T1 antisaturation system:

1. The magnitude and direction of the DC flux component in the core of T1. The greater the flux the more urgent is the need to take evasive action.

2. Which of the four possible states the exciter waveform is currently at.

3. The polarity of the error signal. This directs the antisaturation circuit which way to go in order to avoid fighting the action of the main converter feedback loop. This last factor is inherently taken care of by controlling the window width since the polarity of the error signal is an indicator of which way the main loop is intending to go.

Figure 17:
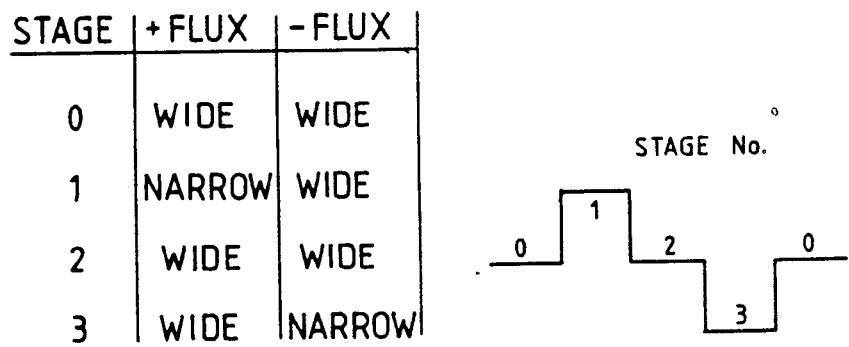
FIG. 17 is a chart showing the wave form period variation for DC component correction in transformer T1 in FIG. 14.

The window control is therefore only influenced by factors 1 and 2 and can be shown to obey the table of FIG. 17. The stage number is decoded from logic signals in the thyristor control sequencer.

Figure 18:
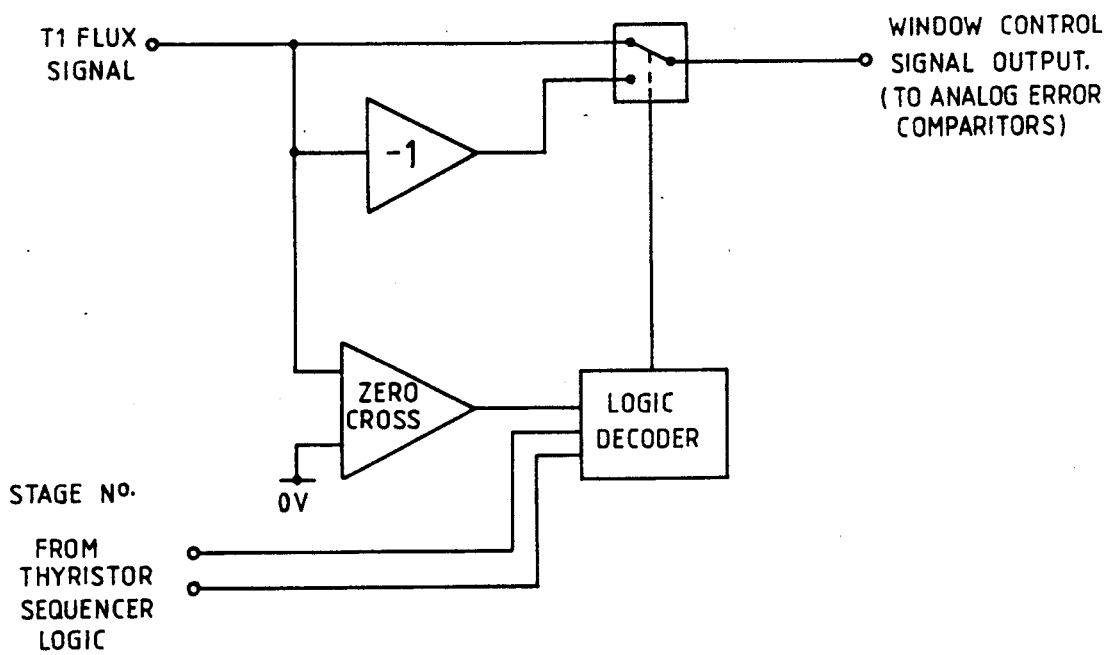
FIG. 18 is a circuit for implementing DC component correction for transformer T1 in FIG. 14.
Figure 19:
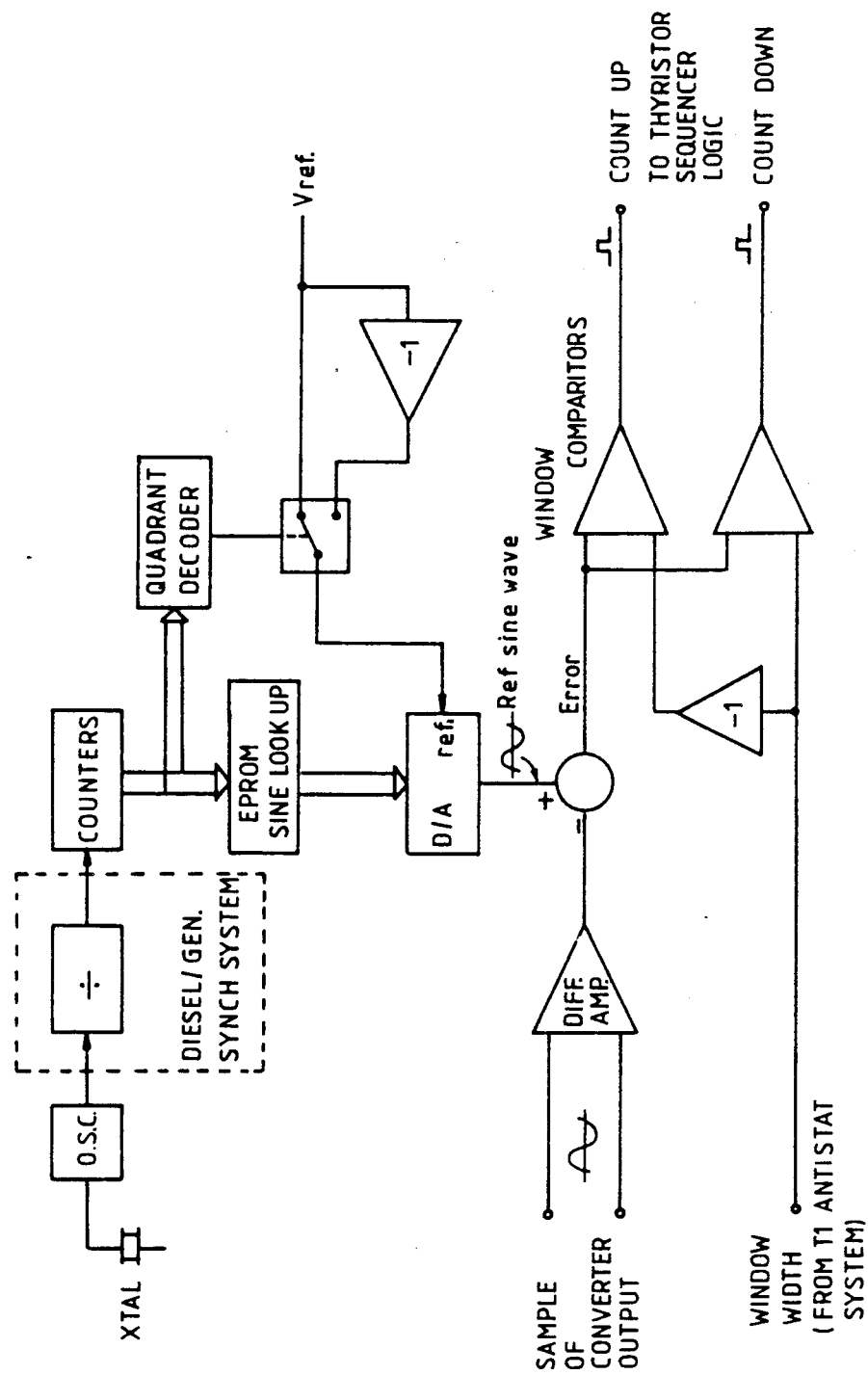
FIG. 19 is a block diagram of the circuit which controls thyristor firing sequence and period.
Figure 20:
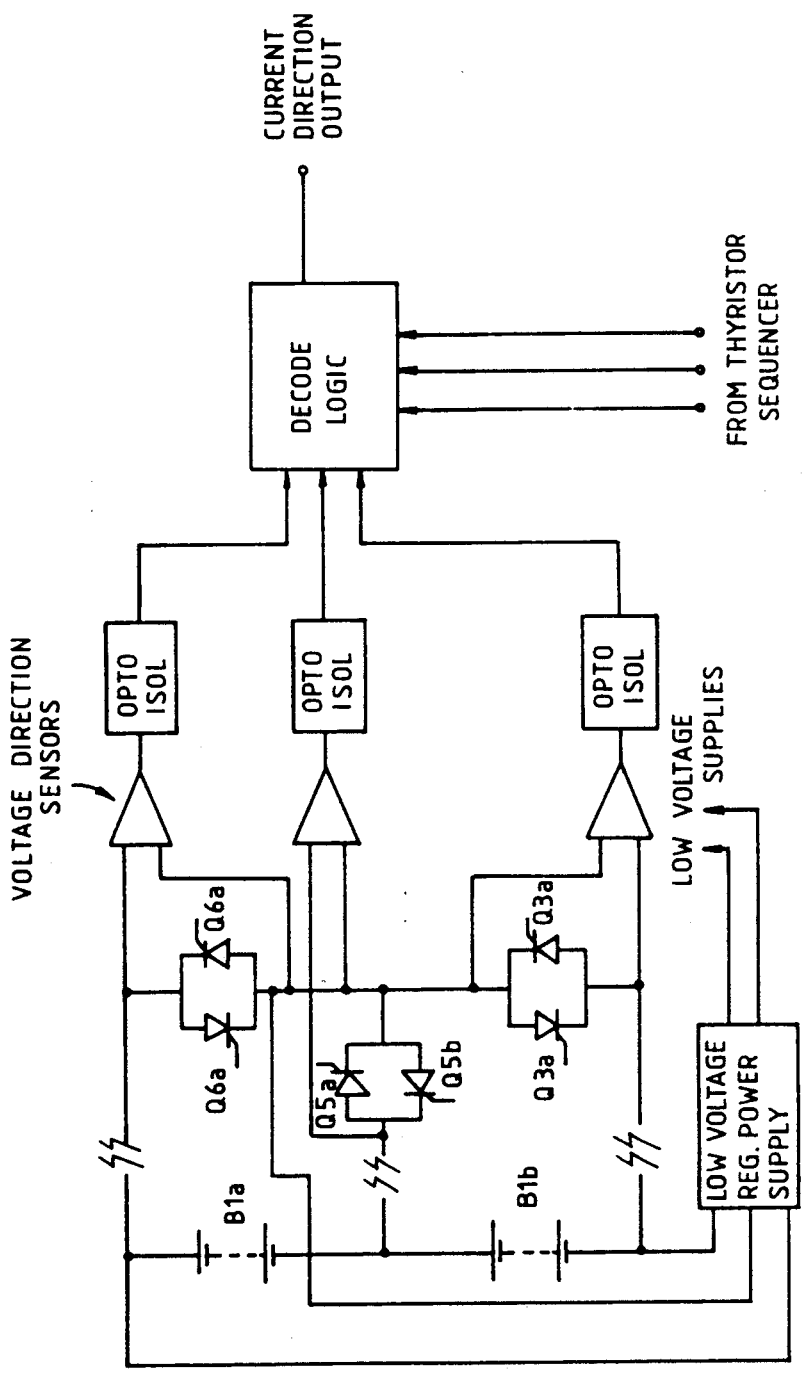
FIG. 20 is a block diagram detecting circuit for current direction.

FIG. 18 shows the block diagram of a system which Would satisfy the above requirements.

SINE WAVE GENERATOR AND MAIN FEEDBACK LOOP

Figure 21:
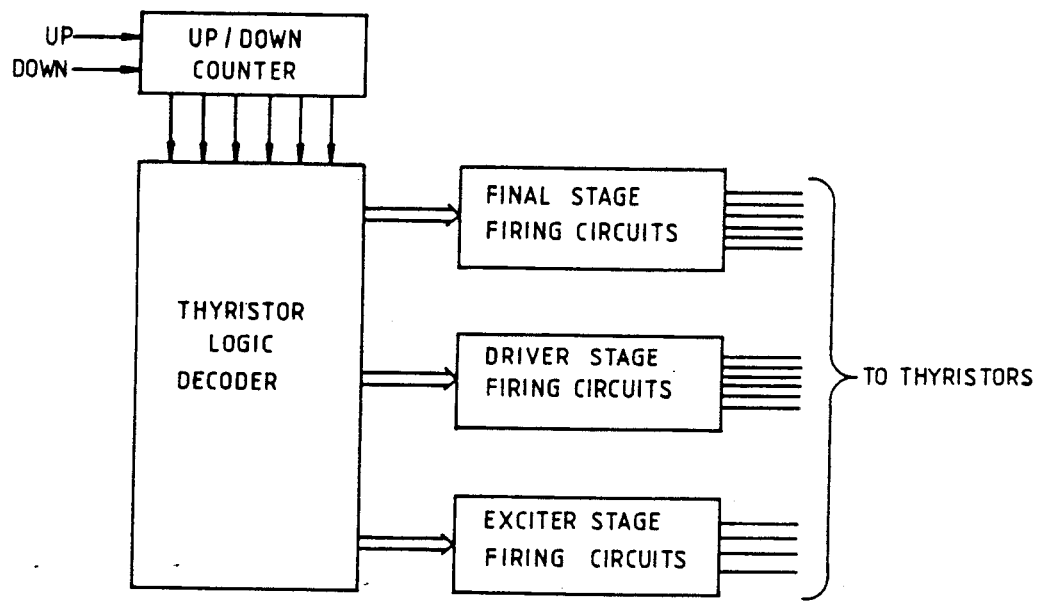
FIG. 21 is a block diagram showing logic implementation for thyristor selection.

FIG. 21 shows a block diagram of this section of the converter. A crystal oscillator, the main frequency reference for the converter, is first divided down by a section of a diesel/generator synchronisation system. The divider output drives a set of up/down counters, the outputs of which address a sine function lookup table in an Eprom. The Eprom data outputs are converted to an analog sine wave by the D/A converter. The D/A analog voltage reference is switches to negative polarity by the quadrant decoder for the negative half cycles of the sine wave.

The reference sine wave is compared with a sample of the converter output voltage and the resultant analog error signal is passed on to two voltage comparators. If the error signal remains within the "window" formed by the thresholds of the two comparators, no count up or count down outputs will be generated and the converter output will not change. If the error signal exceeds one of the window boundaries then the corresponding count up or count down pulse that is generated will cause the converter output to step in a direction which reduces the magnitude of the error.

The sensitivity of the two voltage comparators to the amplitude of the error signal may be varied by the "window width" control signal from the exciter-driver interstage transformer antisaturation system. The section on antisaturation systems contains a description of operation.

CURRENT DIRECTION SENSING

The concept of the converter is inherently bi-directional but, as described in the "basic converter concept" section, the method of commutation of certain thyristors (forced or unforced) depends on the direction of current flow at the output of the stage containing those thyristors. Therefore the output current direction of each stage must be monitored by a system (one per stage) and the information must be sent to the thyristor sequencer system.

The obvious method is to insert a small resistor in series with the output of each stage and monitor the voltage developed across it. However, at the power levels envisaged, the power dissipation in this resistor would be very high. If the resistance is made small to reduce the power dissipation then the voltage developed is extremely small and puts stability constraints on the analog circuitry.

Figure 22:
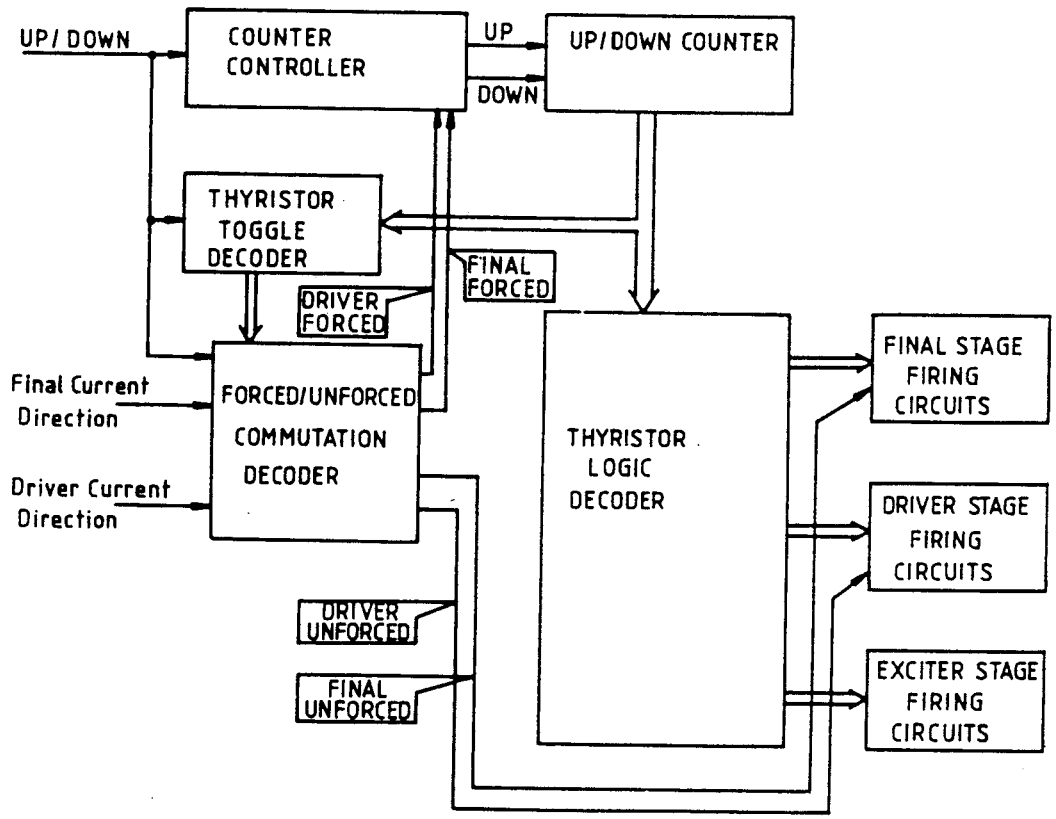
FIG. 22 is a block diagram of the logic circuit which avoids the difficulties of high current circulation, as shown in FIGS. 12 and 13.

A better method is to make use of the voltage drops that already exist across the converter thyristors, since it is the current direction that is required, not the magnitude. FIG. 11 shows that the output current of the converter stage is returned through terminal y and therefore must pass through one of the following thyristor pairs: Q3a/Q3b, Q4a/Q4b or Q5a/Q5b. The forward voltage drop across a conducting thyristor is of the order of 1 volt but the voltage sense mechanism must be able to withstand the full potential of $V_{B1}$ when neither thyristor in a pair is conducting. The thyristor sequencer logic is used to select a voltage sense circuit in unison with selection of thyristor pairs. FIG. 22 shows a block diagram of the system.

THYRISTOR SEQUENCE

The following describes the logic required to sequence the thyristor pairs. The description relates to the configuration of FIG. 10B, incorporating in stage one and two the circuitry of FIG. 11.

The waveform of FIG. 10A is produced by a full bridge auxiliary commutated stage, termed the "Exciter".

The heart of the logic "thyristor sequencer" comprises a six bit up/down counter and a logic decoder (FIG. 21). Each binary value out of the counter equates with a set of thyristors in the exciter, driver and output stages, through the decoder. Clocking of the counter sequences the thyristors through their combinations to produce the waveforms of FIG. 9B. The counter is clocked up until the maximum voltage is produced. The counter then counts down until the minimum voltage (most negative) is produced.

FIG. 22 is an expansion of FIG. 21.

The sequencer counter outputs are first decoded to indicate to the forced/unforced decoder the next sequencer counter toggle will result in a output and/or driver thyristor toggle. The forced/unforced decoder will then determine in conjunction with the direction of current flow through the thyristors whether there will need to be a forced or unforced commutation.

If a forced commutation, the counter is inhibited for a fixed period of time in the sequencer (up/down) counter controller so that the resultant reverse voltage across the thyristor going out of circuit exceeds in time the maximum turn off time for the thyristors at worst case conditions. Also allowed for here is that the complete transfer of current from one thyristor pair to another takes a finite time which is mostly determined by the series inductance in the circuit. This series inductance comprises mostly the leakage inductance of the interstage transformers.

The interstage transformers are therefore specially wound to result in the minimum leakage inductance.

If an unforced commutation is required the incoming thyristors are inhibited from being fired until the voltage across the interstage transformer is low enough to ensure that no reverse current flow will occur as outlined in thyristor toggling conditions 4 and 1, previously.

In most instances, the DC power source will not be provided with a centre tap but it will be seen for example in FIG. 7A that this is not an essential element of the invention. FIG. 8 is the electrical equivalent of FIG. 7A, but nevertheless avoids a need for that centre tap.

In other instances, by careful control of time, there can be a finite but very small gap between the times the switches break and make.

It is advantageous to have the DC power source in a form of a plurality of batteries which can store electrical energy, and this stored energy can be used to supplement the energy from an alternator, by careful adjustment of timing of introduction of the DC power to the alternated power. However the DC power source could also be a rotary DC machine (for example, a DC generator) carried on an alternator shaft or otherwise driven by the diesel engine. The batteries can be replaced by fuel cells, which can be regarded as electrical equivalents. Since the energy stage time of the batteries is small they could be substituted for a small capacitor, or a capacitor bank could be used.

For load levelling applications the convertor appears like a rotary device comprising a AC alternator and DC motor utilising control means which are well known. The converter also features the ability to produce a low frequency low voltage at start up into an electricity grid by starting at say 1 output step in the first half cycle and then building up steps each half cycle until full output is achieved. This can be achieved by controlling the switch sequencing and timing.

For operation in parallel with diesel generators the converter matches frequency or phase and voltage to the generator and brings in a contactor. Power factor to the generator is maintained by slightly varying the converter output voltage until the required current and voltage phase relationship is achieved measured through current and voltage transformers The claims defining the invention are as follows:

1. A converter device comprising a uni-directional electrical energy source having two ends and a bi-directional energy source having two ends and a centre tap, a pair of conductor rails extending from the uni-directional energy source,
    a first bridging conductor having two portions extending between said ends of the bi-directional energy source and respective said rails,
    a second bridging conductor extending between the rails,
    a first pair of switches one in each said first conductor portion,
    a second pair of switches in the second bridging conductor portion,
    an electrical load connected between the centre tap and an electrical conductor between the switches of the second pair,
    so arranged that, upon selective opening and closing of the switches, current flow in the first said energy source is uni-directional, and in the second said energy source is bi-directional.

2. A converter device according to claim 1 wherein current flow is into said uni-directional energy source when the converter functions as a rectifier, and wherein the current flow is out of said uni-directional energy source when the converter functions as an inverter.

3. A converter device according to claim 1 or claim 2 wherein said uni-directional energy source is a rechargeable battery.

4. A converter device according to claim 1 or claim 2 wherein said bi-directional energy source is a battery assembly having at least two effective portions.

5. A converter device according to claim 1 or claim 2 wherein said bi-directional energy source comprises a transformer having a winding, said ends being the ends of that winding of said centre tap being a centre tap of that winding.

6. A converter device according to claim 5 wherein said transformer comprises a second winding connected to said bi-directional energy source.

7. A converter device according to claim 6 wherein said switches are arranged to open and close when there is little or no voltage across them.

8. A converter device according to claim 7 wherein said switches are electric switches arranged to open and close at an alternating current frequency.

9. A converter device according to claim 8 wherein said electronic switches are thyristors, and comprising a thyristor trigger logic circuit which effects said opening and closing of said switches by controlling ON and OFF periods of said thyristors.

10. A converter comprising a plurality of devices according to claim 9 arranged in a cascade array to fire sequentially and produce a stepped wave compatible with a sine wave, and thereby adapted, when connected to an AC power source of the same frequency, to function as an AC to DC converter or a DC to AC inverter.

11. An AC/DC converter having an inverter mode of operation, comprising a transformer, a DC power source with centre tap having a battery or a bank of batteries, a bi-directional second power source and a plurality of switch means, and switch control means.

said transformer having a first winding with a centre tap and a second winding, and said DC power source centre tap connected to a first end of the first winding through one of said plurality of switch means, a second end of said first winding being connected to a negative rail of said battery or batteries through a first said switch means and to the positive rail thereof through another said switch means, and to a first AC terminal through a further said switch means.

bi-directional second power source/power sink coupled to said second winding, said centre tap connecting to a second AC terminal the converter, the said first AC terminal being referenced to a negative or positive rail of said DC power source through another said switch means, said switch control means being operatively coupled to said switch means to control opening and closing of said switch means in a sequence wherein each switch thereof makes contact before its predecessor switch breaks contact, actuation of each switch occurring when an instantaneous voltage difference across the predecessor switch approximates zero as a result of variation of voltage of said bi-directional second power source, and minimal voltage change occurs at that time across said first winding, resulting in no change in voltage at the AC terminals.

12. A converter device according to claim 11 excluding the further switch extending between a said second end of the first winding and the first AC terminal where all switching is not by a make before break action.

13. An AC/DC converter having an inverter mode of operation comprising two transformers, a DC source having a battery or a bank of batteries, a bi-directional second power source/power sink and a plurality of switch means, and switch control means, the first of said transformers having a first winding with a centre tap a second winding, identical with the first winding, and a third winding, a first end of said first winding being connected to a second end of said second winding through a said switch means, the second of said transformers having a first winding, a second winding and a third winding, wherein the said first and second windings are identical and the third winding end is connected to the two AC terminals.

the second end of said first winding of said first transformer being connected to a negative rail of said battery or batteries through another said switch means and to the positive rail thereof, through another said switch means, and to the first end of the said first winding of the second transformer through a further said switch means, the first end of said second winding of said transformer being connected to said negative rail through a said switch means and to the positive rail through a said switch means, and to the second end of said second winding of second transformer through a said switch means.

said centre tap of said first winding connecting to the second end of the said first winding of said second transformer and said centre tap of the second winding connecting to the first end of the said second winding of the second transformer.

the said bi-directional second power source/power sink coupled to said third winding of said first transformer.

the said first end of the first winding of the second transformer also being referenced to the negative and positive rails through said switch means, the said second end of the second winding of the second transformer also being reference to the negative and positive rails through said switch means, said switch control means being operatively coupled to said switch means to control opening and closing of said switch means in a sequence wherein each switch makes contact before its predecessor switch breaks contact, actuation of each switch occurring when an instantaneous voltage difference across the predecessor switch becomes zero (or near zero with different types of semiconductor switches) as a result of variation of the said bi-directional second power source, and so arranged that minimal voltage change occurs at that time across said first and second windings of said first transformer, resulting in minimal change in voltage at the AC terminals.

14. A converter comprising:

an exciter stage, a driver stage and an output stage, a pair of interstage transformers interconnecting those stages in cascade, said driver stage and said output stage each comprising a uni-directional electrical energy source having two ends and a bi-directional energy source having two ends and a centre tap, a pair of conductor rails extending from the uni-directional energy source, a first bridging conductor having two portions extending between said ends of the bi-directional energy source and respective said rails, a second bridging conductor extending between the rails, a first pair of switches one in each said first conductor portion, a second pair of switches in the second bridging conductor portion, said switches each being electric switches arranged to open and close at an alternating current frequency, an electrical load connected between the centre tap and an electrical conductor between the switches of the second pair, so arranged that, upon selective opening and closing of the switches, current flow in the first said energy source is uni-directional, and in the second said energy source in bi-directional, a negative feed back loop being derived from the output stage, and a pair of antisaturation systems being coupled to the feedback loop and applied to windings of each respective said transformer.

15. A converter according to claim 14 wherein each said antisaturation system comprises means operable to vary an average area of input wave form of the driver stage and output stage above and below zero volts.

16. A converter according to claim 15 further comprising a respective Hall sensor magnetically coupled to the core of each said transformer, a primary voltage sensor, and calculating means which modifies control of said thyristors in response to sensed transformer core flux and primary voltage amplitude.

17. A converter comprising a plurality of converter devices in cascade, each device comprising a unidirectional electrical energy source having two ends and a centre tap, a pair of conductor rails extending from the uni-directional energy source, a first bridging conductor having two portions extending between said end of the bi-directional energy source and respective said rails, a second bridging conductor extending between the rails, a first pair of switches one in each said first conductor portion, a second pair of switches in the second bridging conductor portion, said switches each being electric switches arranged to open and close at an alternating current frequency, an electrical load connected between the centre tap and an electrical conductor between the switches of the second pair, so arranged that, upon selective opening and closing of the switches, current flow in the first said energy source is uni-directional, and in the second said energy source is bi-directional, and thyristor control devices which control timing of firing of the thyristors and the time periods between said firings so that the output of the cascade of devices approximates a sine wave.

18. A converter according to claim 17 further comprising a sine wave generator having a crystal oscillator, a frequency divider, a set of up/down counters, an Eprom having a sine function look-up table, a digital/analogue device, means connecting those said elements in that sequence to comparators which identify error, and error correction means coupled to the converter.

* * * * *